Dec. 1, 1942.  K. R. KNOBLAUCH  2,303,843
CONTROL SYSTEM
Filed July 29, 1940

INVENTOR.
KARL RUSSELL KNOBLAUCH
BY C. B. Spangenberg
ATTORNEY

Patented Dec. 1, 1942

2,303,843

UNITED STATES PATENT OFFICE 2,303,843

CONTROL SYSTEM

Karl Russell Knoblauch, Trenton, N. J., assignor to The Brown Instrument Company, Philadelphia, Pa., a corporation of Pennsylvania Application July 29, 1940, Serial No. 348,245

8 Claims. (Cl. 236—15)

The present invention relates to the control of rotary hearth furnaces or kilns in response to some variable such as the temperature of the material that is being treated therein.

In treating material in a rotary hearth it is necessary to maintain a constant, predetermined temperature in order to produce a high quality product. This, in the past, has been hard to accomplish due to the fact that the hearth is rotating and consequently the material is moving lengthwise as well as circumferentially therein. By means of the present invention, however, this difficulty has been overcome and a single temperature measuring element is used to measure both the temperature of the hearth and the temperature of the material being treated therein. This same measuring element is used to control the temperature of the hearth.

It is an object of my invention to provide means to measure and control the temperature of material being treated in a rotary hearth. It is a further object of the invention to measure and record the temperature of both a rotary hearth and the material being treated therein by means of a single temperature measuring element. It is a further object of the invention to measure and control the temperature of material being treated in a rotary hearth furnace during a portion of each revolution thereof and to measure the temperature of the hearth during the remainder of each revolution.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Figure 1:
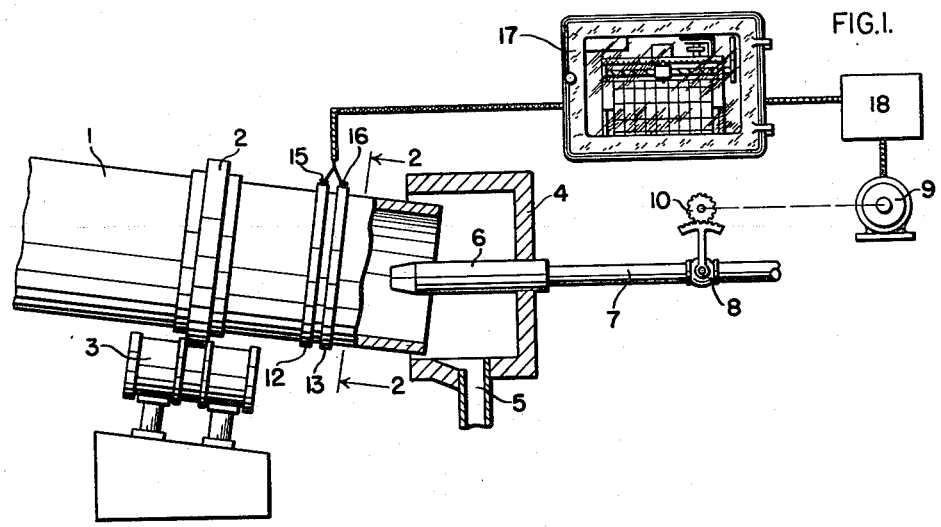
Fig. 1 is a view, partly in section, of a rotary hearth showing the firing end thereof and the control instruments.

Referring to the drawing there is shown in Figure 1, a rotary hearth 1 which is provided with a tire 2 and which is mounted on the usual rollers 3 so that it can be rotated with the tire in engagement with the rollers. Other pairs of rollers are used on the other end of the hearth and the hearth may be rotated by any suitable means (not shown). At the lower end of the hearth there is provided a hood 4 into which the material that has been treated falls and from which it is discharged through a down spout 5. Extending through the hood 4 is a burner 6 that is supplied with suitable fuel through a pipe 7, the fuel supply being adjusted by a valve 8. This valve is adjusted by means of a reversible valve motor 9 working through suitable gearing 10.

In order to measure the temperature of the material in the hearth and the hearth itself, there is provided a suitable temperature measuring device 11 such as a thermocouple which extends through the wall of the hearth and into the path of the material that is being treated. The terminals of this thermocouple are connected respectively to slip rings 12 and 13 that surround the hearth 1 and are insulated therefrom by insulating members 14. The response of the thermocouple is taken from the slip rings by means of brushes 15 and 16 to a potentiometer control device 17. This potentiometer may be any suitable kind such as a self-balancing one that measures the temperature to which the thermocouple is subjected and makes a record of the value thereof and is also used to close control switches depending upon whether the value of the temperature is above or below some desired point. This potentiometer acting, through a time controlled interruptor 18 and a hearth controlled interruptor 19, serves to energize the valve motor 9 for rotation in one direction or the other to properly adjust the fuel valve and thereby the temperature of the material being treated.

The interruptor 19 is shown as taking the form of a mercury switch that is mounted on a switch supporting lever 20 pivoted at 21 to some suitable support. This switch is closed by means of a rod 22 projecting from the side of the hearth; the path of the rod being such that it engages one end of the supporting lever 20. The switch 19 is opened by means of a second rod 23 whose path is intercepted by the other end of the switch supporting lever 20.

Figure 2:
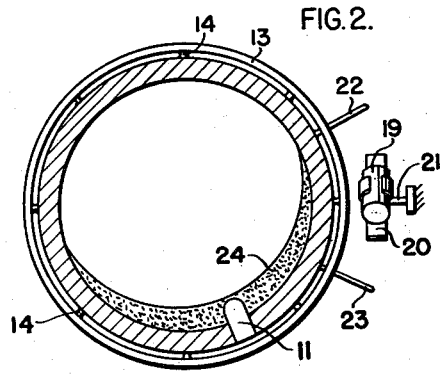
Fig. 2 is a view on line 2—2 of Fig. 1.
Figure 3:
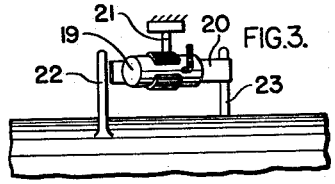
Fig. 3 is a view looking from the top of Fig. 2.

In the operation of the hearth material to be treated is fed in the upper end and passes in a stream down through the hearth to be discharged at the lower end through the hood 4 and the down spout 5. In its passage through the hearth the material tends to climb up the wall as shown at 24 in Figure 2. When the thermocouple 11 has reached this circumferential position during the rotation of the hearth it is covered by the material and the thermocouple will, therefore, measure the temperature of this material. At other times the thermocouple will be exposed to the interior of the hearth and will measure the temperature of the combustion gases or air therein. The rods 22 and 23 are so positioned with respect to the switch supporting lever 20 that rod 22 will close the switch 19 just as the thermocouple is completely covered by the material and the rod 23 will open the switch just as the thermocouple emerges from under the material in the hearth.

Figure 4:
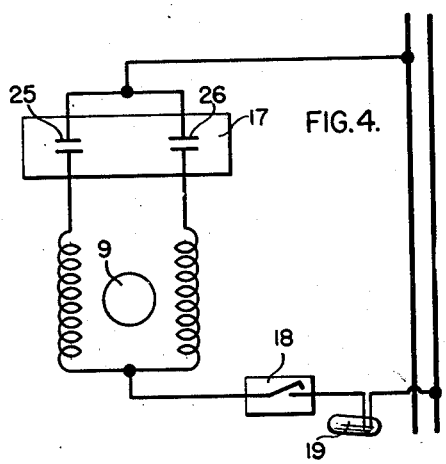
Fig. 4 is a wiring diagram.

The potentiometer 18 is provided with control switches 25 and 26 one of which is closed when the value of the temperature being measured is above a predetermined normal and the other of which is closed when the value of the temperature is below said normal. Therefore, whenever the temperature measured by the thermocouple is above that which it is desired to maintain the material one of the switches will be closed to drive the motor in a direction to close the valve 8. In a like manner if the temperature of the material is low the other switch will be closed to drive the motor 9 in the opposite direction. Since, however, the switch 19 is located in the common motor line as shown in Figure 4, the motor 9 can only be used to adjust the valve while the switch 19 is closed or while the thermocouple 11 is covered by the material in the hearth. Thus the same thermocouple measures both the temperature of the material in the hearth and the temperature of the hearth itself but can control only when the thermocouple is covered by the material. Therefore, a control is provided which is responsive only to material temperature. Also in the motor circuit is a time control interruptor 18 which closes at periods more frequent than the closure of the switch 19. This switch serves to cause any control action produced by the motor 9 to be in steps rather than continuous so that the valve 8 will be adjusted a small bit at a time to give the temperature a chance to change before it is again adjusted. In this manner the temperature of the material is changed gradually and hunting will not occur.

Figure 5:
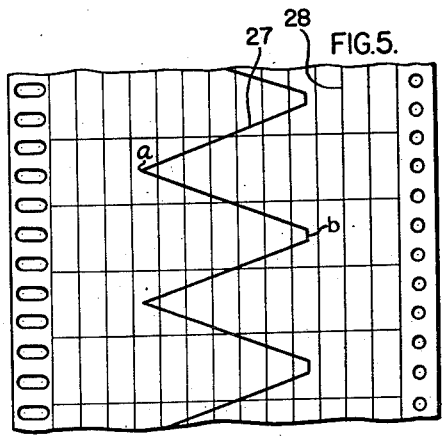
Fig. 5 is a section of chart.

There is shown in Figure 5 a section of a record 27 that is produced on a chart 28 in the potentiometer 17. As is seen the record will be jagged in appearance with the lower temperatures indicated at $a$ the temperature of the material and the higher temperatures indicated at $b$ the temperatures of the hearth. It is noted that the record line at $a$ is a point whereas the record line at $b$ is a short line. This difference in length of time that the instrument is recording the temperature of the material and the temperature of the hearth is due to the fact that the material covers only a small part of the inside circumference of the hearth as is shown at 24.

From the above description it will be seen that I have provided an efficient apparatus for measuring the temperature of a rotary hearth or kiln and the temperature of the material therein by means of a single thermocouple and that this same thermocouple can be used to control the temperature in response solely to the temperature of the material that is being treated.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a control system the combination with a rotary hearth, of a temperature measuring device extending into the interior thereof whereby it will periodically be covered by material in the hearth, means to continually indicate the temperature measured by said device, control means to control the temperature of the hearth and means to render said control means operative only at the times said device is covered by the material.

2. In a rotary hearth control system, a burner to supply heat to the hearth, a fuel supply for said burner, means responsive to the temperature of material in said hearth to control the fuel supply, said means comprising a temperature measuring element located in the hearth and adapted to periodically engage the material therein, means to render said control means inoperative except when the temperature responsive element is covered by the material, and means to at all times indicate the temperature measured by said element.

3. In a system to control the temperature of a rotary hearth having material to be treated therein, said material tending to gather into a stream as it flows through the hearth, a temperature responsive element extending through a wall of said hearth whereby it is alternately covered and uncovered by said stream of material as said hearth rotates to continuously and alternately measure the temperature of the hearth and the material therein, means to control said temperatures in response to the measurement made by said element, and means to render said control means inoperative except when said element is covered by the stream of material.

4. A control system for a rotary hearth comprising a temperature responsive element projecting into said hearth, a control instrument responsive to measurements made by said instrument, fuel supply means for said hearth, a valve in said fuel supply line, means operated by said control instrument to adjust said valve, a member rotating with said hearth and means in the path of movement of said member and operated thereby to interrupt said adjustment in response to rotation of said hearth.

5. The method of measuring and controlling the temperatures in a rotary hearth which comprises periodically subjecting a single temperature measuring element alternately to the temperature of the hearth and to the temperature of the material contained therein and varying the supply of fuel supplied to the hearth solely in response to the temperature of the material as measured by the said element.

6. In a system to control the temperature of a rotary hearth having material to be treated therein, said material tending to gather into a stream as it passes through the hearth, a single temperature responsive element extending through a wall of the hearth whereby it will alternately be covered and uncovered by the material therein, a recording means to continuously record the temperatures measured by said element, means to control the temperature of the hearth, and means operated by said hearth during rotation of the same to interrupt the control except when said element is covered by the material.

7. In a temperature control system for a rotary hearth comprising in combination a thermocouple projecting through a wall of the hearth, slip rings encircling the hearth, a connection between each slip ring and an element of the thermocouple, an exhibiting instrument to exhibit temperatures measured by the thermocouple, connections between said slip rings and instrument, control means to control the temperature of the hearth operated by said instrument, means operated in synchronism with the rotation of the hearth to interrupt the control, and periodically operating means to interrupt the operation of said control.

8. In a temperature recording and controlling system for a rotary hearth the combination of a temperature responsive element attached to and extending into the hearth whereby it is alternately covered and uncovered by material in the hearth as the latter rotates, a recording and controlling instrument located separate from the hearth, connecting means between said element and said instrument whereby the instrument will alternately record the temperature of the hearth and the material therein, a fuel supply for said hearth, a control valve to regulate said fuel supply, means operated by said control instrument to adjust said valve in response to measurements made by said element, a switch to periodically interrupt said control, and means carried by said hearth to actuate said switch, said last means being so positioned relative to said element that the control is interrupted except when the element is covered by the material in the hearth.

K. RUSSELL KNOBLAUCH.